United States Patent
Tsai

(10) Patent No.: US 8,926,090 B2
(45) Date of Patent: Jan. 6, 2015

(54) EYEGLASS FRAME ASSEMBLY

(71) Applicant: Yih Tah Optics Co., Ltd., Tainan (TW)

(72) Inventor: Ming-Hsiang Tsai, Tainan (TW)

(73) Assignee: Yih Tah Optics, Co., Ltd. (TW)

( * ) Notice: Subject to any disclaimer, the term of this patent is extended or adjusted under 35 U.S.C. 154(b) by 0 days.

(21) Appl. No.: 14/037,935

(22) Filed: Sep. 26, 2013

(65) Prior Publication Data

US 2014/0333888 A1  Nov. 13, 2014

(30) Foreign Application Priority Data

May 8, 2013  (TW) .............................. 102208528 U

(51) Int. Cl.
*G02C 1/02* (2006.01)
(52) U.S. Cl.
CPC ....................................... *G02C 1/02* (2013.01)
USPC ........................................................ 351/110
(58) Field of Classification Search
USPC .............................. 351/110, 124, 153; 16/228
See application file for complete search history.

(56) References Cited

U.S. PATENT DOCUMENTS

| 7,458,680 | B1 * | 12/2008 | Cheng | 351/110 |
| 7,553,015 | B2 * | 6/2009 | Vittorio | 351/110 |
| 2006/0119790 | A1 * | 6/2006 | Tsai | 351/110 |
| 2009/0109394 | A1 * | 4/2009 | Perie | 351/110 |
| 2009/0174861 | A1 * | 7/2009 | Perie | 351/110 |

\* cited by examiner

*Primary Examiner* — Hung Dang
(74) *Attorney, Agent, or Firm* — Holland & Hart, LLP

(57) ABSTRACT

An eyeglass frame assembly includes temple mounting portions and temple units. Each temple mounting portion has front and rear faces and an engagement hole. Each temple unit includes a temple arm and a pivot member. The temple arm has a connection portion that is inserted into the engagement hole and that is provided with a pivot hole. The pivot member is pivoted to the connection portion and is mounted on the temple mounting portion, and has a pivot pin that is pivotally inserted into the pivot hole. The pivot member resides in the engagement hole and engages the front and rear faces of the respective one of the temple mounting portions.

7 Claims, 8 Drawing Sheets

US 8,926,090 B2

EYEGLASS FRAME ASSEMBLY

CROSS-REFERENCE TO RELATED APPLICATION

This application claims priority of Taiwanese Application No. 102208528, filed on May 8, 2013.

BACKGROUND OF THE INVENTION

1. Field of the Invention

The present invention relates to an eyeglass frame assembly, more particularly to an eyeglass frame assembly having screwless connection between a lens unit and a pair of temple units.

2. Description of the Related Art

A conventional eyeglass frame assembly primarily includes a lens unit and a pair of temple units that are respectively and pivotally connected to left and right mounting portions of the lens unit using screws. Generally, the conventional eyeglass frame assembly has a pair of relatively tiny screws for pivotal connection between the lens unit and the temple units. However, installation of the relatively tiny screws is somewhat inconvenient because the temple units need to be aligned accurately with predetermined positions on the lens unit to register with little threaded holes in the temple units and the lens unit, and thus a tool has to be used to engage the tiny screws to the little threaded holes.

SUMMARY OF THE INVENTION

Therefore, an object of the present invention is to provide an eyeglass frame assembly that can alleviate the above drawbacks of the prior art.

According to the present invention, an eyeglass frame assembly includes a lens unit and a pair of spaced-apart temple units.

The lens unit has two spaced-apart temple mounting portions. Each of the temple mounting portions has front and rear faces, and an engagement hole extending through the front and rear faces.

The temple units are respectively and pivotally connected to the temple mounting portions. Each of the temple units includes a temple arm and a pivot member.

The temple arm is insertable through the engagement hole of a respective one of the temple mounting portions. The temple arm has a connection portion that is inserted into the engagement hole and that is provided with a pivot hole extending in a top-bottom direction.

The pivot member is pivoted to the connection portion of the temple arm and is mounted stationarily on the respective one of the temple mounting portions. The pivot member has a pivot pin that extends in the top-bottom direction and that is pivotally inserted into the pivot hole of the connection portion. The pivot member resides in the engagement hole and engages with the front and rear faces of the respective one of the temple mounting portions.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Figure 1:
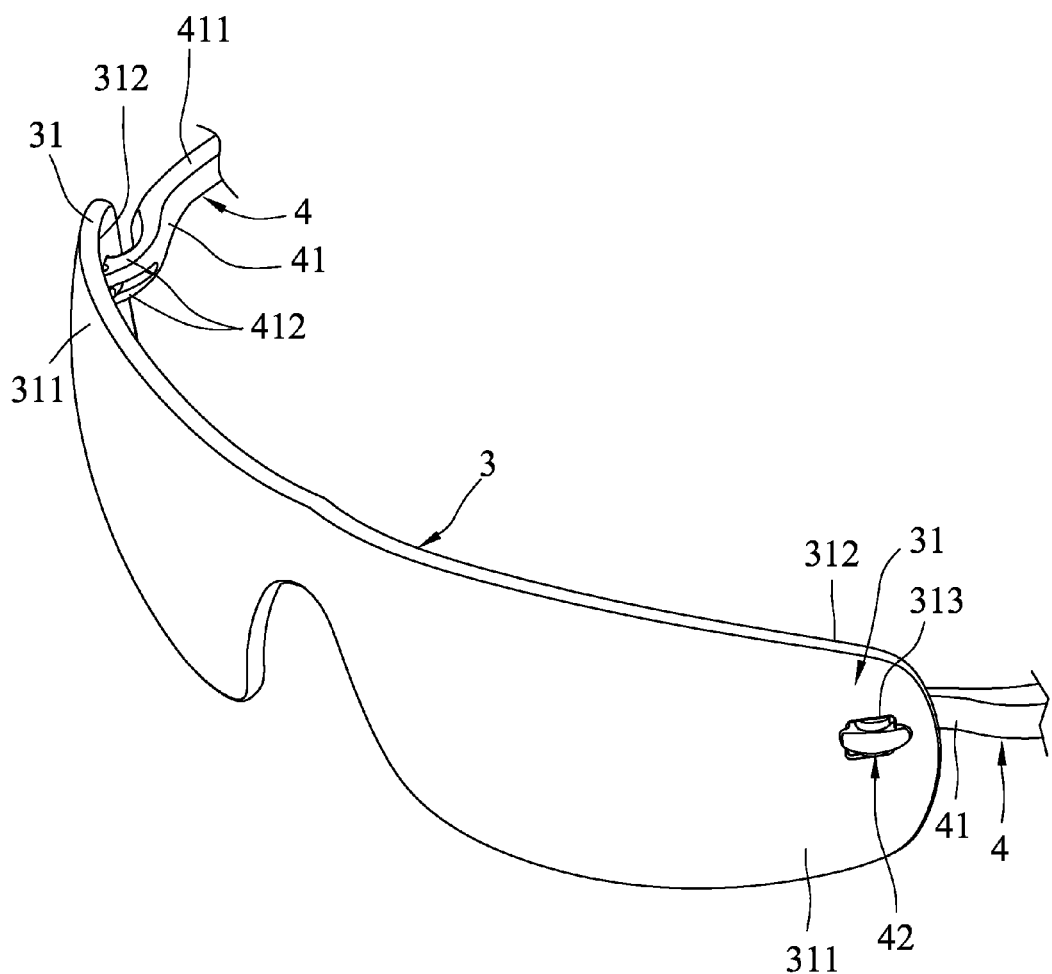
FIG. 1 is a fragmentary perspective view of the first preferred embodiment of an eyeglass frame assembly according to the present invention.

Before the present invention is described in greater detail, it should be noted that like elements are denoted by the same reference numerals throughout the disclosure.

Referring to FIGS. 1, 2, 4, and 6, the first preferred embodiment of an eyeglass frame assembly according to the present invention is illustrated. The eyeglass frame assembly comprises a lens unit 3 that has two spaced-apart temple mounting portions 31, and a pair of spaced-apart temple units 4 that are respectively and pivotally connected to the temple mounting portions 31. The temple units 4 are pivotable relative to the lens unit 3 between a folded state and an unfolded state.

Since the eyeglass frame assembly has a symmetrical structure, only a left half portion of the assembly will be described in detail hereinafter.

In this preferred embodiment, each of the temple mounting portions 31 of the lens unit 3 has front and rear faces 311, 312 and an engagement hole 313 that extends through the front and rear faces 311, 312.

Preferably, the lens unit 3 is a single piece lens plate that has the temple mounting portions 31. However, in actual implementation, the lens unit 3 can be designed as a lens frame (not shown) that accommodates at least one lens plate, and the temple mounting portions 31 may be provided in the lens plate or the lens frame. Since the feature of this invention does not reside in the structure of the lens unit 3, which may be readily appreciated by those skilled in the art, details of the same are omitted herein for the sake of brevity.

Each of the temple units 4 includes a temple arm 41 that is insertable through the engagement hole 313 of a respective one of the temple mounting portions 31, and a pivot member 42 that is pivotally connected to the temple arm 41 and that engages the respective one of the temple mounting portions 31. The temple arm 41 has a connection portion 411 that is inserted into the engagement hole 313 of a respective one of the temple mounting portions 31 and that is provided with a pivot hole 413 extending in a top-bottom direction. The pivot member 42 is pivoted to the connection portion 411 of the temple arm 41 and is mounted stationarily on the respective one of the temple mounting portions 31. The pivot member 42 resides in the engagement hole 313 and engages with the front and rear faces 311, 312 of the respective one of the temple mounting portions 31.

In this preferred embodiment, the connection portion 411 has a pair of lug sections 412 that are spaced apart from each other in the top-bottom direction and each of which defines the pivot hole 413. Each lug section 412 has a curved front end.

Preferably, the pivot member 42 further has a pivot plate 421 that resides in the engagement hole 313, a curved front clamping rib 425 that protrudes from a front end portion of the pivot plate 421 and that abuts against the front face 311 of the respective one of the temple mounting portions 31, and two rear clamping portions 423 that are formed on a rear end portion of the pivot plate 421, that are spaced apart from each other in a left-right direction, and that abut against the rear face 312 of the respective one of the mounting portions 31. The pivot plate 421 is disposed between the lug sections 412 and has opposite top and bottom faces. A pivot pin 424 has a top pin segment that projects upwardly from the top face of the pivot plate 421 to extend into the pivot hole 413 in one of the lug sections 412, and a bottom pin segment that projects downwardly from the bottom face of the pivot plate 421 to extend into the pivot hole 413 in the other one of the lug sections 412. The front clamping rib 425 projects upwardly and downwardly from the front end portion of the pivot member 421. More preferably, the pivot plate 421 further has two notches 422 that are spaced apart from each other in the left-right direction. Each of the notches 422 extends between the front clamping rib 425 and a respective one of the rear clamping portions 423 of the pivot member 42. The notches 422 engage an edge bounding the engagement hole 313 of the respective one of the temple mounting portions 31.

Figure 2:
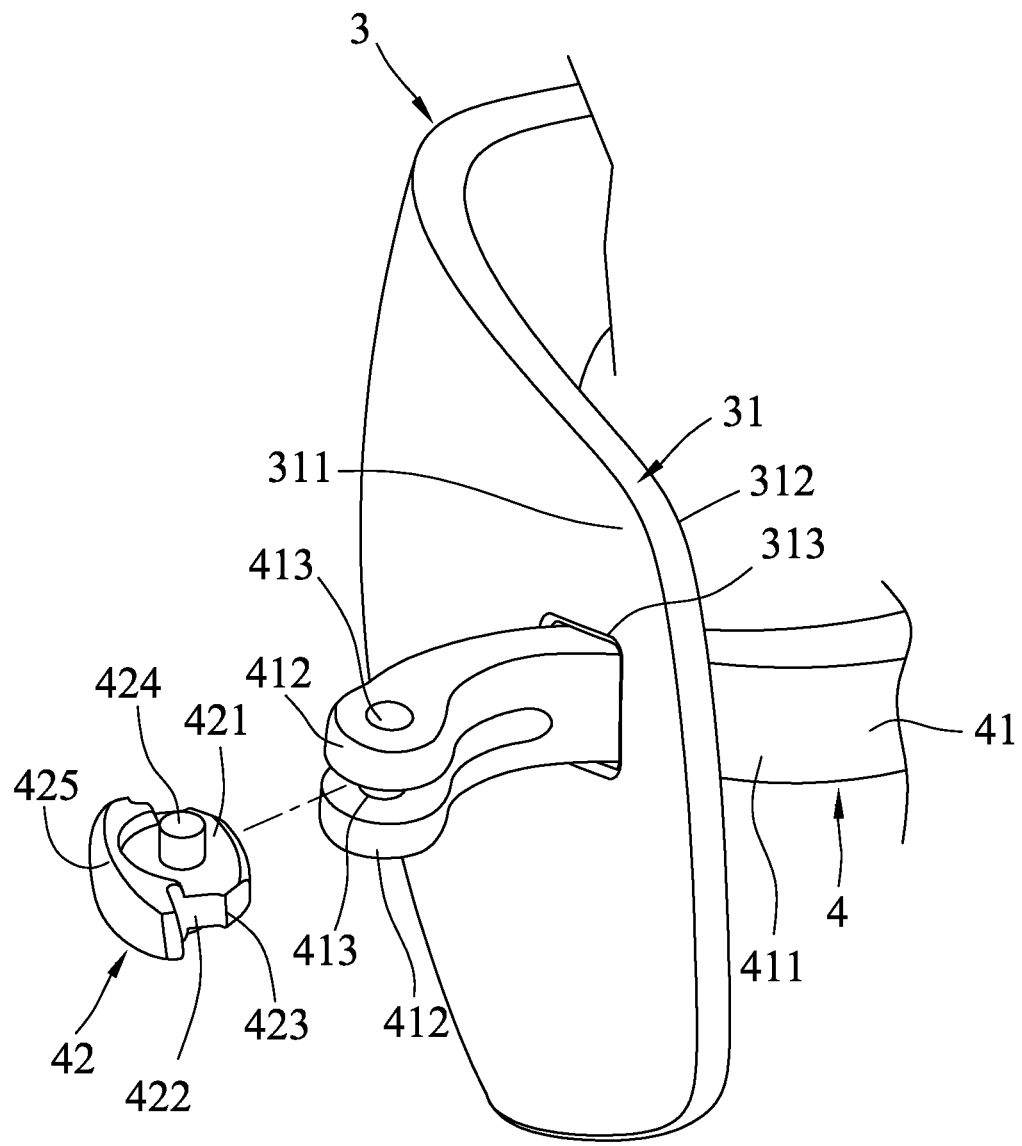
FIG. 2 is a fragmentary perspective view of the first preferred embodiment illustrating an unassembled state of a pivot member.
Figure 3:
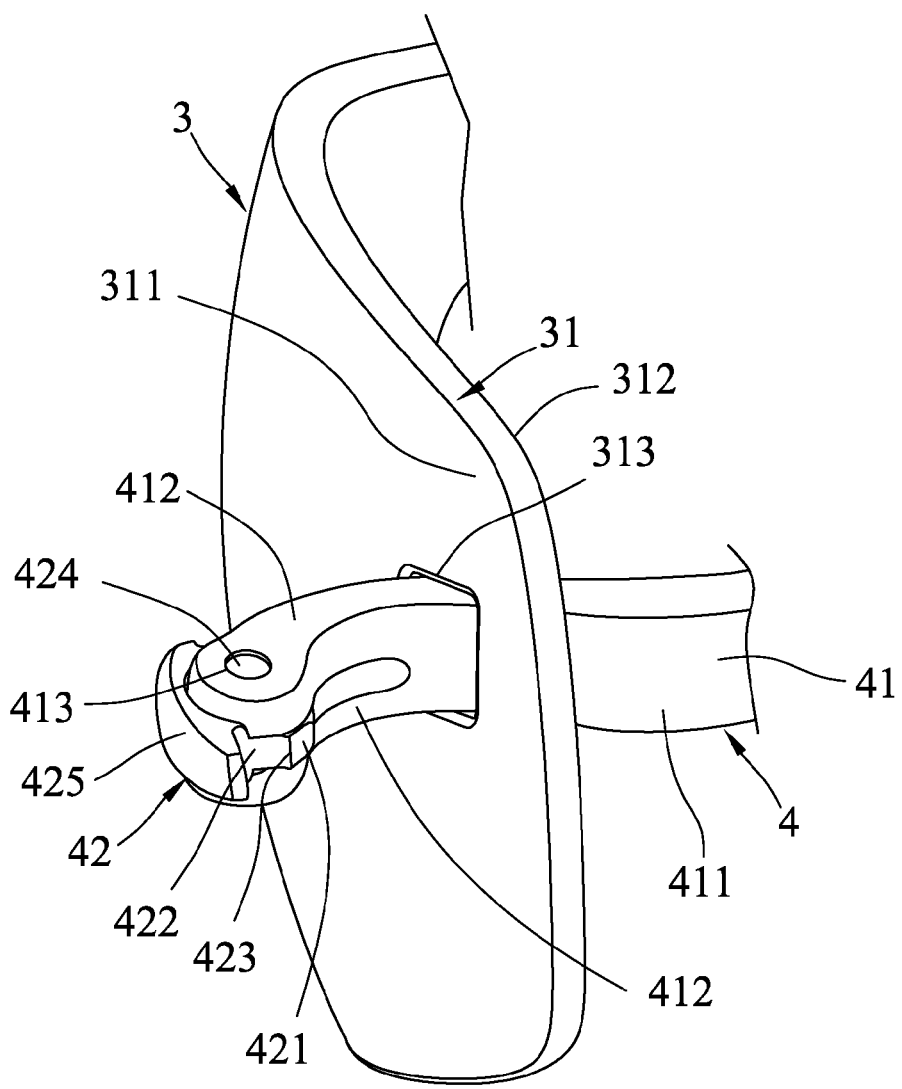
FIG. 3 is the same view as FIG. 2 but illustrating an assembled state of the pivot member.

Referring to FIGS. 2 and 3, when the temple units 4 are assembled with the lens unit 3, the connection portion 411 of a corresponding one of the temple units 4 is first extended through the engagement hole 313 of the respective one of the temple mounting portions 31, such that the lug sections 412 protrude from the front face 311 of the respective one of the temple mounting portions 31. Then, the pivot plate 421 of the pivot member 42 is inserted between the lug sections 412 which are movable relative to each other in a resilient manner. When the top and bottom pin segments of the pivot pin 424 extend into the respective pivot holes 413 in the lug sections 412, the pivot member 42 is pivoted to the temple arm 41.

Figure 4:
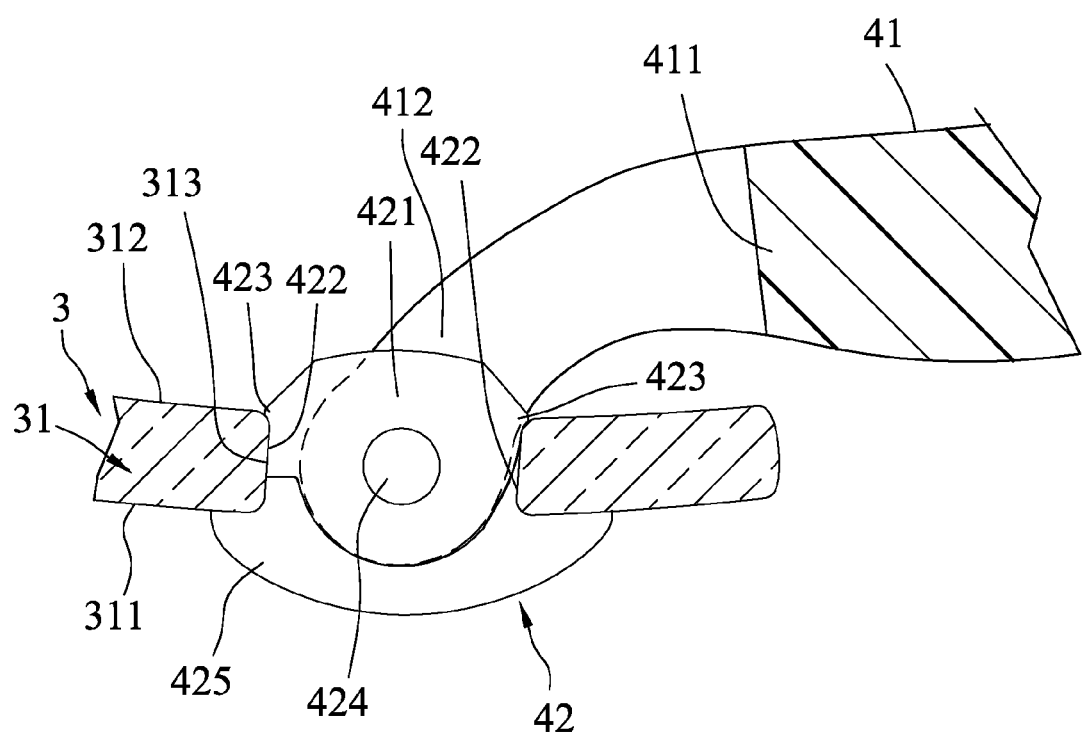
FIG. 4 is a fragmentary partly sectional top view of the first preferred embodiment.
Figure 5:
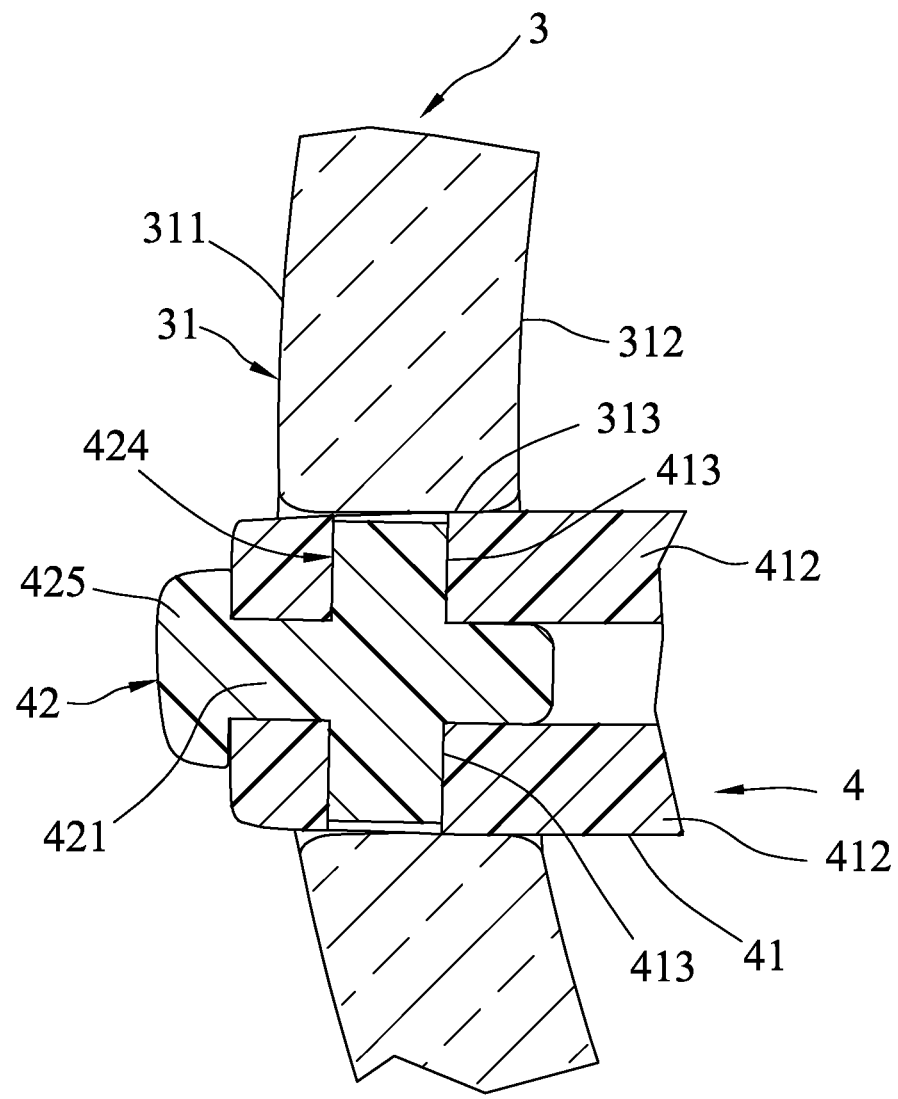
FIG. 5 is a fragmentary side sectional view of the first preferred embodiment.
Figure 6:
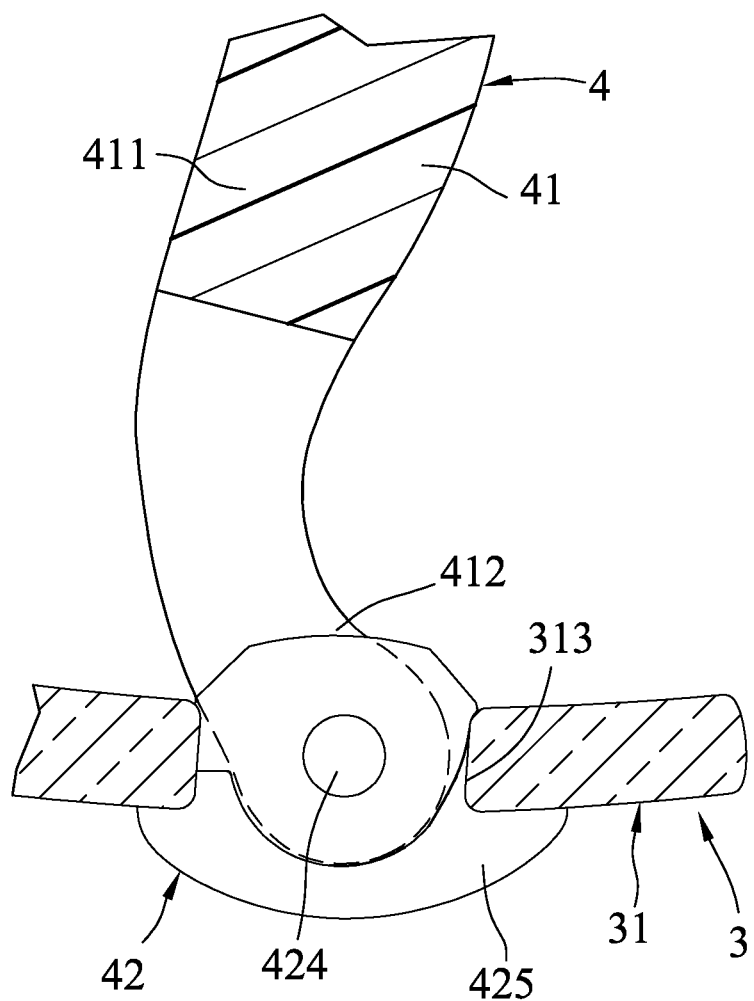
FIG. 6 is the same view as FIG. 4 but illustrating a folded state of a temple arm.

Referring to FIGS. 3 to 5, when the temple arm 41 is pulled rearwardly, the rear clamping portions 423 are resiliently squeezed into and thereafter passed through the engagement hole 313 in the temple mounting portion 31, so that the notches 422 engage left and right parts of the edge that bounds the engagement hole 313. Accordingly, the rear clamping portions 423 of the pivot member 42 abut against the rear face 312 of the temple mounting portion 31, and the front clamping rib 425 abuts against the front face 311. In such a manner, the temple units 4 are completely assembled with the lens unit 3.

Referring back to FIGS. 4 and 6, by virtue of the pivot member 42 which engages the front and rear faces 311, 312 of the temple mounting portion 31 in a clamping manner, the temple arm 41 is pivotally connected to the lens unit 3 without using any screw, and the temple arm 41 is pivotable relative to the lens unit 3 between the folded and unfolded states.

Figure 7:
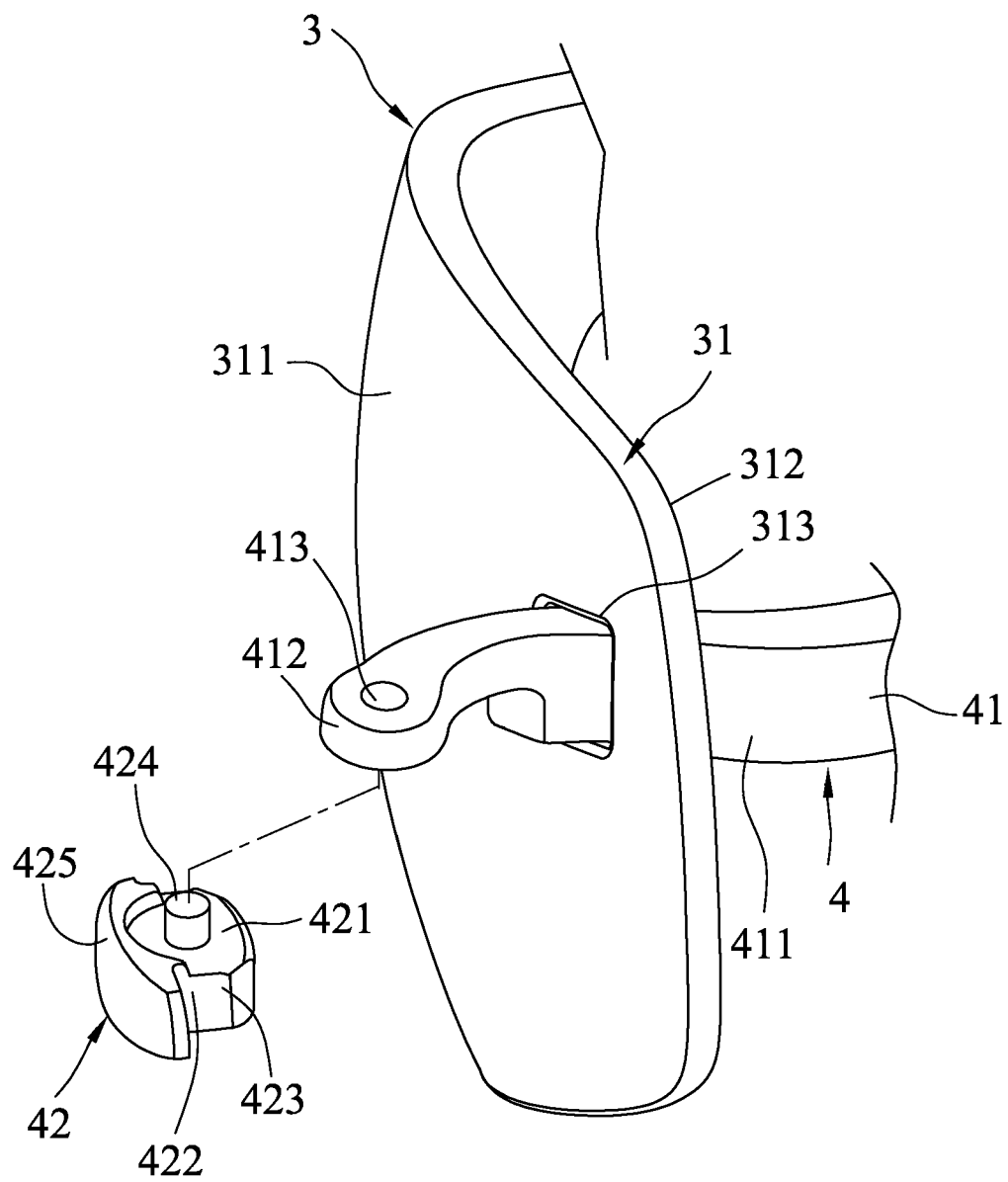
FIG. 7 is a fragmentary perspective view of the second preferred embodiment of an eyeglass frame assembly according to the present invention.
Figure 8:
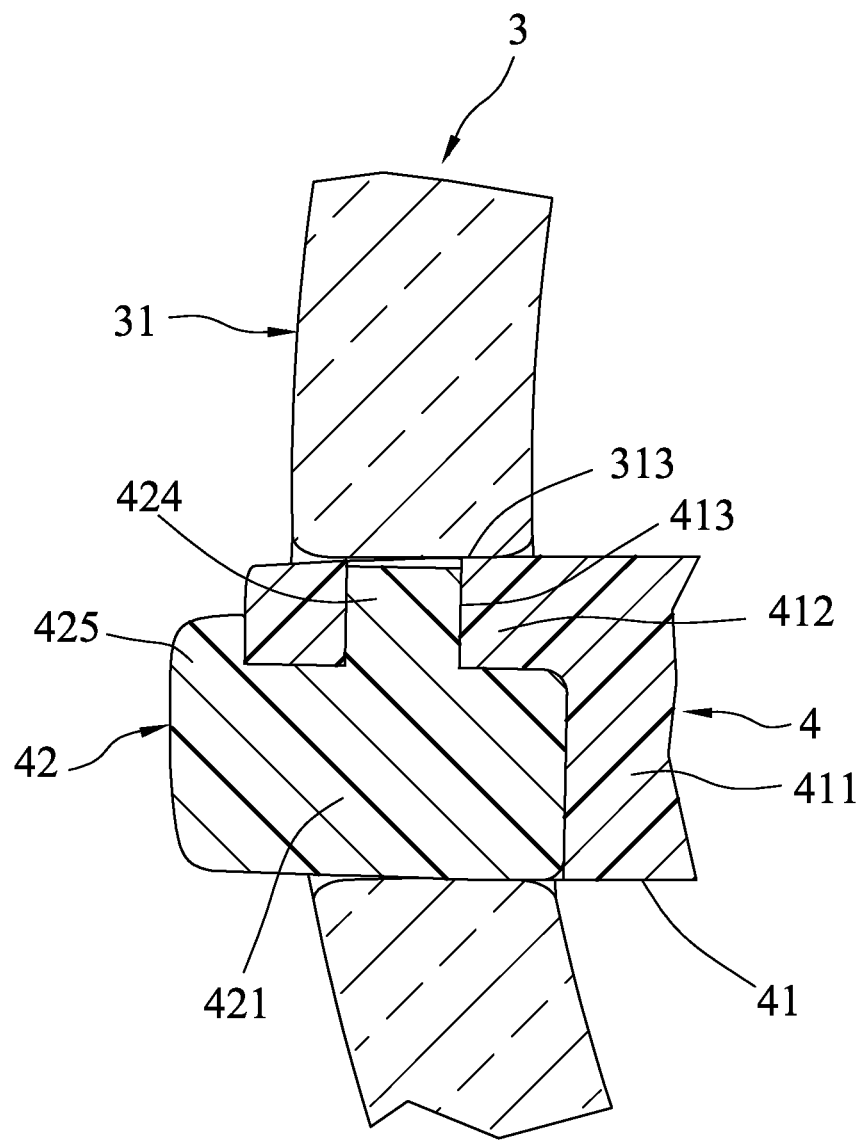
FIG. 8 is a fragmentary side sectional view of the second preferred embodiment.

FIGS. 7 and 8 show the second preferred embodiment of an eyeglass frame assembly according to the present invention, which has a structure generally similar to that of the first preferred embodiment. However, in this preferred embodiment, the connection portion 411 has only one lug section 412 that defines the pivot hole 413. The pivot plate 421 and the lug section 412 are disposed in a stack within the engagement hole 313 of the respective one of the temple mounting portions 31. In addition, the pivot member 42 has a pivot pin 424 that extends in the top-bottom direction and that is pivotally inserted into the pivot hole 413 of the connection portion 411. The pivot pin 424 projects from the pivot plate 421 to extend into the pivot hole 413. A bottom end of the pivot plate 421 is flush with that of the front clamping rib 425.

When the eyeglass frame assembly is assembled, the connection portion 411 of the temple arm 41 first extends through the engagement hole 313 of the temple mounting portion 31, such that the lug section 412 protrudes from the front face 311 of the temple mounting portion 31. The pivot pin 424 of the pivot member 42 is inserted upwardly into the pivot hole 413 of the temple arm 41 until the pivot plate 421 abuts against a bottom side of the lug section 412. Then, the pivot member 42 and the connection portion 411 are pulled rearwardly until the rear clamping portions 423 resiliently extend through the engagement hole 313 and abut against the rear face 312 of the temple mounting portion 31. As a result, the pivot plate 421 resides in the engagement hole 313, and the front clamping rib 425 abuts against the front face 311 of the temple mounting portion 31. Accordingly, each of the temple units 4 is completely assembled with the lens unit 3 in such a manner that the pivot plate 421 and the lug section 412 abut against each other and are disposed within the engagement hole 313 of the respective one of the temple mounting portions 31.

To sum up, by virtue of the pivot pin 424 that extends into the pivot hole 413, and the pivot member 42 that is pivoted to the temple arm 41, that resides in the engagement hole 313 and that engages with the front and rear faces 311, 312 of the respective one of the temple mounting portions 31, each of the temple units 4 is completely assembled with the respective one of the temple mounting portions 31 in the screwless manner. Therefore, the eyeglass frame assembly of the present invention does not require any screw driver and screws for assembling together the lens unit 3 and the temple units 4.

While the present invention has been described in connection with what are considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. An eyeglass frame assembly, comprising:
   a lens unit having two spaced-apart temple mounting portions, each of said temple mounting portions having front and rear faces, and an engagement hole extending through said front and rear faces; and
   a pair of spaced-apart temple units respectively and pivotally connected to said temple mounting portions, each of said temple units including
      a temple arm insertable through said engagement hole of a respective one of said temple mounting portions, said temple arm having a connection portion that is inserted into said engagement hole and that is provided with a pivot hole extending in a top-bottom direction, and
      a pivot member pivoted to said connection portion of said temple arm and mounted stationarily on the respective one of said temple mounting portions, said pivot member having a pivot pin that extends in the top-bottom direction and that is pivotally inserted into said pivot hole of said connection portion,
      wherein said pivot member resides in said engagement hole and engages with said front and rear faces of the respective one of said temple mounting portions.

2. The eyeglass frame assembly as claimed in claim 1 wherein said pivot member further has a pivot plate that resides in said engagement hole, a front clamping rib that protrudes from a front end portion of said pivot plate and that abuts against said front face of the respective one of said temple mounting portions, and two rear clamping portions that are formed on a rear end portion of said pivot plate, that are spaced apart from each other in a left-right direction, and that abut against said rear face of the respective one of said mounting portions.

3. The eyeglass frame assembly as claimed in claim 2, wherein said connection portion has a pair of lug sections that are spaced apart from each other in the top-bottom direction and each of which defines said pivot hole, said pivot plate being disposed between said lug sections and having opposite top and bottom faces, said pivot pin having a top pin segment that projects upwardly from said top face of said pivot plate to extend into said pivot hole in one of said lug sections, and a bottom pin segment that projects downwardly from said bottom face of said pivot plate to extend into said pivot hole in the other one of said lug sections.

4. The eyeglass frame assembly as claimed in claim 2, wherein said front clamping rib projects upwardly and downwardly from said front end portion of said pivot member.

5. The eyeglass frame assembly as claimed in claim 2, wherein said pivot plate further has two notches that are spaced apart from each other in the left-right direction, each of said notches extending between said front clamping rib and a respective one of said rear clamping portions of said pivot member, said notches engaging an edge bounding said engagement hole of the respective one of said temple mounting portions.

6. The eyeglass frame assembly as claimed in claim 2, wherein said connection portion further has a lug section that defines said pivot hole, said pivot plate and said lug section being disposed in a stack within said engagement hole of the respective one of said temple mounting portions, said pivot pin projecting from said pivot plate to extend into said pivot hole.

7. The eyeglass frame assembly as claimed in claim 1, wherein said lens unit is a single piece lens plate that has said temple mounting portions.

\* \* \* \* \*